Patented Oct. 4, 1949

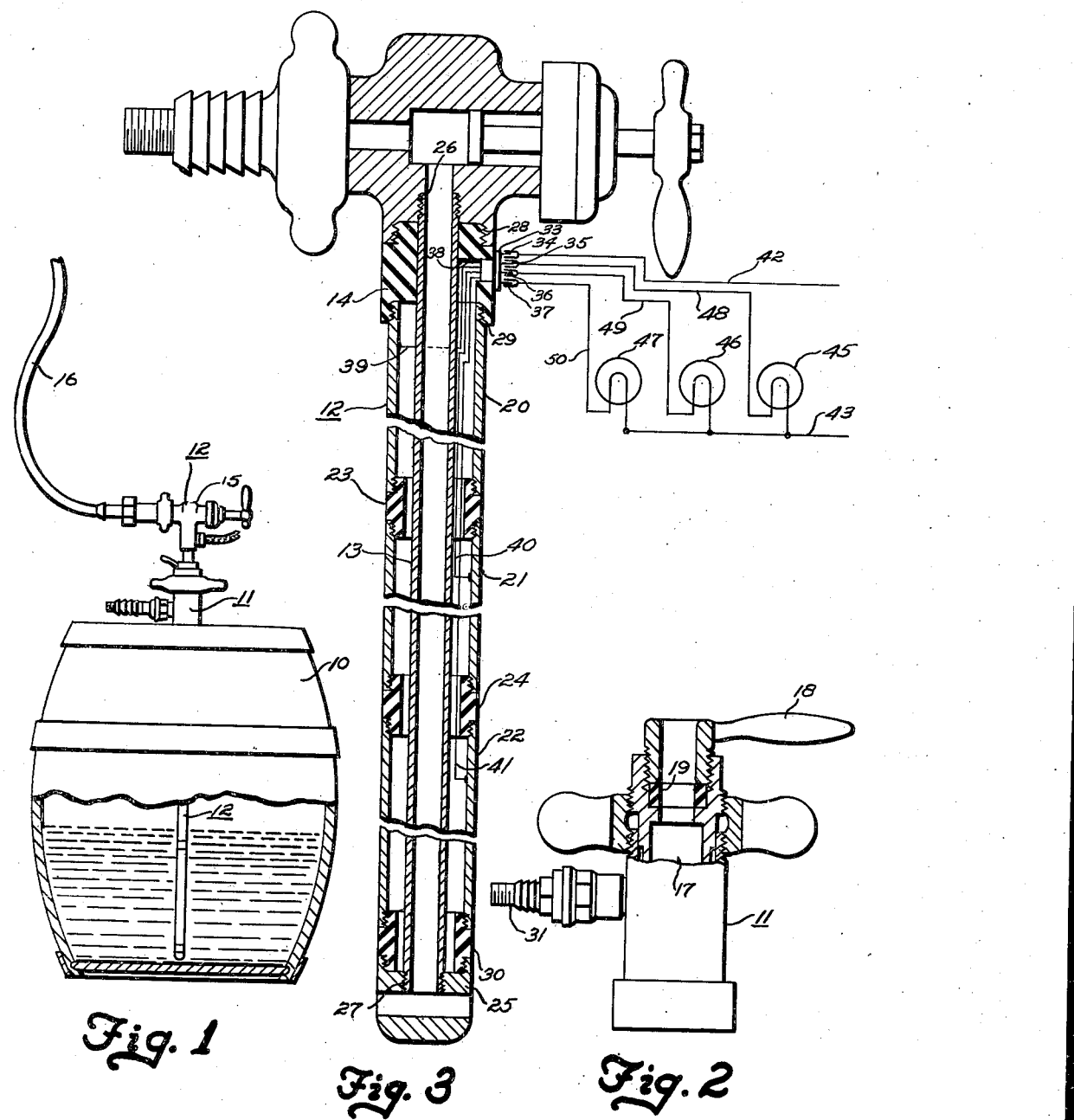

2,483,967

UNITED STATES PATENT OFFICE 2,483,967

TAPPING TUBE AND LIQUID LEVEL INDICATOR

Theodore R. Eberwine, Cleveland Heights, Ohio

Application April 22, 1947, Serial No. 743,139

1 Claim. (Cl. 73—304)

My invention relates in general to a liquid level indicating means and particularly to a liquid level indicating means combined with a tapping tube for a container, whereby the operator may have an indication of the liquid level of the liquid in the container, and includes the giving of an indication when the container is substantially empty.

It is standard practice to employ a tap and a tapping tube to remove liquid, such for example, as beer or other beverages, from a container or a barrel. The tap is mounted in the top of the barrel and the tapping tube is inserted within the tap whereby a passageway is provided through the top of the container for connection to a discharge hose.

My invention relates to a liquid level indicator having a first part thereof within the container responsive to the liquid level and a second part outside of the container adapted to indicate the liquid level, and connection means passing through the opening in the tap to interconnect the liquid responsive part within the container to the liquid level indicator outside of the container.

Therefore, an object of my invention is the provision of a combined tapping tube and liquid level indicator which may be inserted through the opening in the tap mounted on the container.

Another object of my invention is the provision of a liquid level indicator which may be combined with the tapping tube so that no additional opening is required to be made in the container for obtaining access thereto for determining the level of the liquid.

Other objects and a fuller understanding of my invention may be had by referring to the following description and claim, taken in conjunction with the accompanying drawing, in which:

Figure 1 illustrates a container having my combined tapping tube and liquid level indicator mounted thereon, the container being partly sectioned to illustrate the lowermost end of the tapping tube immersed in the liquid;

Figure 2 is a view of the tap with a portion thereof shown in section to illustrate the parts thereof; and Figure 3 is an enlarged cross-sectional view of my combined tapping tube and liquid level indicator.

With reference to the figures of the drawing, the reference character 10 represents a container for containing a liquid, such for example, as beer or other beverage to be dispensed. Mounted in the top of the barrel or container is a tap 11 having an opening 17 through which my tapping tube 12 is inserted. As illustrated in Figure 3, the entire tapping tube comprises a metal conduit 13, an insulated adapter body 14 and valve head 15. Attached to the valve head 15 is a hose 16 through which the liquid is discharged. Surrounding the conduit 13 are a plurality of metal tube sections 20, 21 and 22. The tube sections 20 and 21 are threadably connected together by an insulating ring 23 and the tube sections 21 and 22 are threadably connected together by an insulating ring 24. The insulating rings 23 and 24 not only provide a mechanical interconnection for the tube sections but also electrically insulates the tube sections from each other. Attached to the lower end of the tube section 22 by means of an insulated ring 30 is an inlet body 25. The inlet body 25 threadably engages the lower end of the conduit 13 by means of threads 27. The upper end of the conduit 13 is threadably connected to the valve head 15 by the threads 26. The upper end of the tube section 20 is threadably connected to the adapter body by means of the threads 29. The adapter body is threadably connected to the valve head 15 by means of the threads 28. As illustrated, the conduit 13, the metal tube sections 20, 21 and 22, and the inlet body 25 are all threadably connected to form a complete tubular unitary assembly. The outer surface of the tubular assembly or section is defined by the metal tube sections and the insulating rings and is adapted to be removably inserted through the opening 17 in the tap 11. After the tubular section is inserted into the opening 17 of the tap, the handle 18 is turned to clamp a rubber or other yieldable body 19 around the tubular section to make an air-tight seal therewith. Air under pressure is applied to the nozzle 31 for injecting air into the container whereby the liquid is forced upwardly through the conduit 13, the adapter body 14 and the valve head 15 for discharging liquid through the hose 16. Mounted externally of the container and the tapping tube is a liquid level indicator comprising three lamps 45, 46 and 47 which are adapted to light depending upon the condition of the liquid in the container bridging the respective tube sections and the conduit 13. The lamps 45, 46 and 47 are respectively connected in a circuit with the metal tube sections 20, 21 and 22. This electrical connection is effected through means of an electrical plug 33 mounted in the adapter body 14. In the illustrated embodiment of my invention, the electrical plug has four terminal pins 34, 35, 36 and 37, although any number may be employed depending upon the number of tube sections and the number of the lamps. As illustrated, the terminal pin 34 is electrically connected to the conduit 13 by means of a conductor 38; the terminal pin 35 is electrically connected to the tube section 20 by conductor 39; the terminal pin 36 is electrically connected to the tube section 21 by a conductor 40, and the terminal pin 37 is electrically connected to the tube 22 by a conductor 41. The terminal pin 34 is connected to one side of electrical supply source indicated by the reference character 42. One side of the lamps 45, 46 and 47 is respectively connected to the other side of the electrical supply source indicated by the reference character 43. The other side of the lamps 45, 46 and 47 is respectively connected to the terminal pins 35, 36 and 37. In operation, when the liquid level is above the insulated ring 23 whereby all three tube sections are in contact with the liquid within the container, three separate liquid bridgeable circuits are established with the conduit 13, whereby all of the three lamps 45, 46 and 47 are lit. As the liquid level drops below the ring 23, the liquid bridgeable circuit which was formerly established between the metal tube section 20 and the conduit 13 is broken and the lamp 45 goes out, but the two lamps 46 and 47 still remain lit. Similarly, when the liquid drops below the insulator ring 24 the lamps 45 and 46 are out and the lamp 47 is still lit. When the liquid level drops below the insulated ring 30, all three lamps are out, which is an indication that the liquid in the container is substantially exhausted, and serves notice for the operator to be prepared to change the liquid container to a fresh supply.

My combined tapping tube and liquid level indicating means may be readily insertable in the opening 17 of the tap 11 and thereby obviates the necessity of providing an additional opening in the container in order to gain access thereinto for determining the level of the liquid. By my construction, liquid level indicator has a first part within the container responsive to the liquid level, namely, the bridgeable tube sections and the metal conduit which comprise electrical bridgeable contacts, and has a second part externally of the container, namely, the indicating lamps, the first and second parts being electrically connected together by conductor means which pass through the opening 17 of the tap 11. The first part of the liquid level indicator within the container may be of any suitable electrical arrangement whereby electrical circuits are established or controlled in accordance with the level of the liquid within the container.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

In combination with a tap for a container, said tap having an opening extending therethrough, the improvement of a combined tapping tube and liquid level indicating means, said tapping tube comprising a head having a valve, a hollow adapter body of insulating material connected to said head, and a conduit extending through said adapter body and connected to said head, said conduit and head providing a liquid passage through which liquid may flow from the container, a plurality of spaced electrical contacts longitudinally mounted along said conduit, insulating means for insulating the contacts from each other and from the conduit, said conduit, said electrical contacts and said insulating means being adapted to fit through said opening of the tap and extending into said container, electrical indicating means external of said tapping tube and said container for indicating the liquid level in the container, and electrical circuit means extending through said hollow adapter for interconnecting the conduit, the electrical contacts and the electrical indicating means, said conduit constituting a common for one side of said electrical circuit and said contacts being respectively connected to the other side of said electrical circuit, said conduit and said contacts being electrically bridgeable by the liquid in the container.

THEODORE R. EBERWINE.

REFERENCES CITED

The following references are of record in the file of this patent:

UNITED STATES PATENTS

| Number | Name | Date |
| --- | --- | --- |
| 1,093,745 | Turner | Apr. 21, 1914 |
| 2,138,677 | Meyer | Nov. 29, 1938 |

FOREIGN PATENTS

| Number | Country | Date |
| --- | --- | --- |
| 837,014 | France | Oct. 25, 1938 |